Aug. 14, 1923.
W. S. PRITCHARD
TUBE FORMING MACHINE
Filed Sept. 27, 1920
1,464,583
7 Sheets-Sheet 1
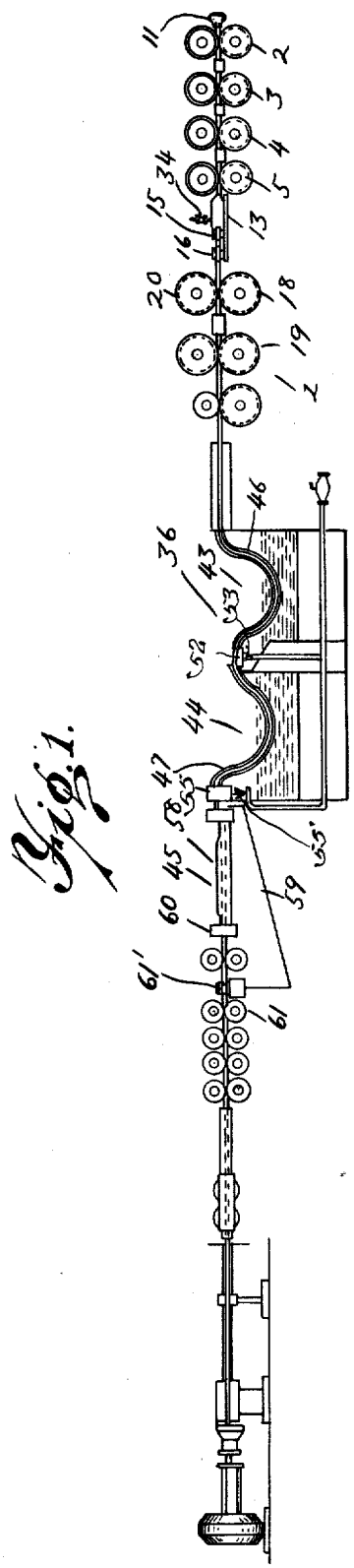
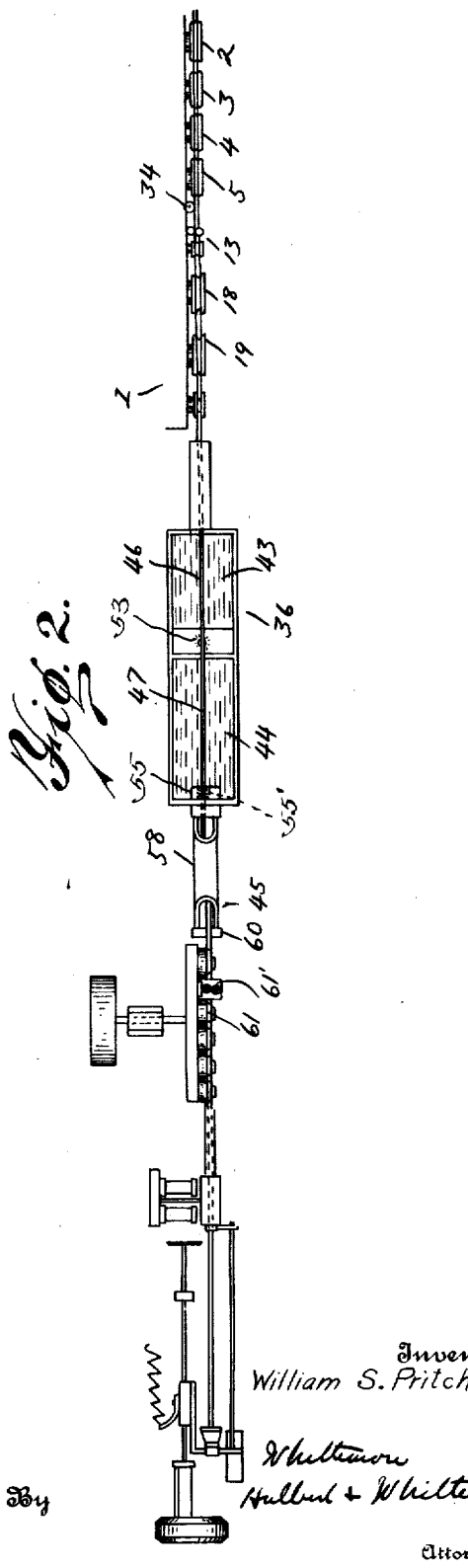
Inventor
William S. Pritchard
By Whittemore
Hulbert & Whittemore
Attorneys

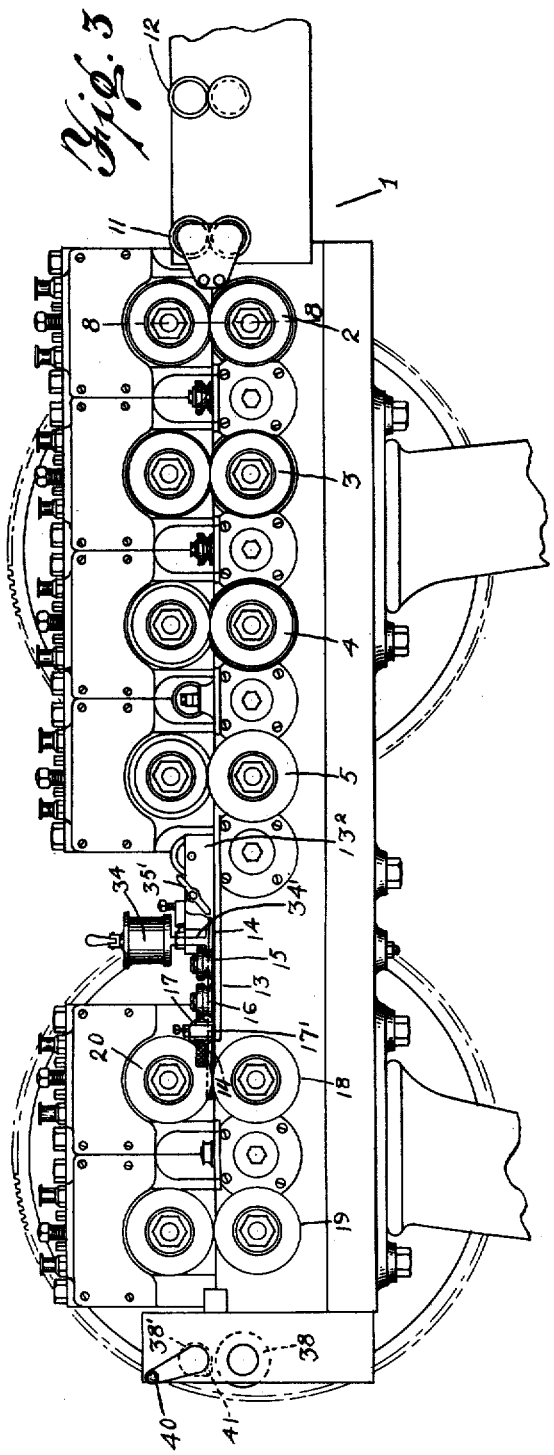
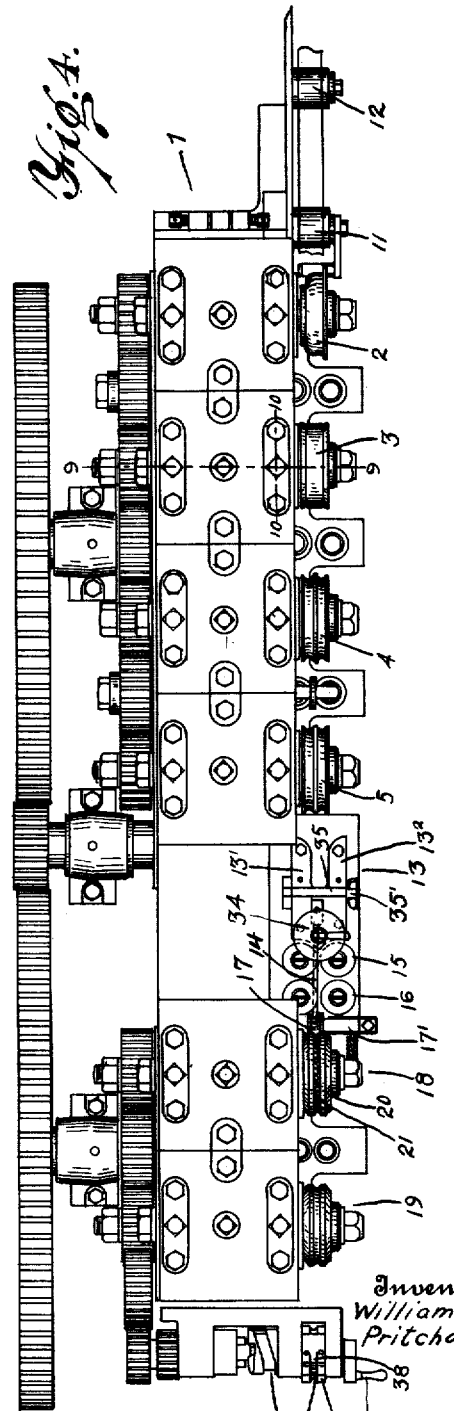

Aug. 14, 1923.
W. S. PRITCHARD
1,464,583
TUBE FORMING MACHINE
Filed Sept. 27, 1920    7 Sheets-Sheet 3
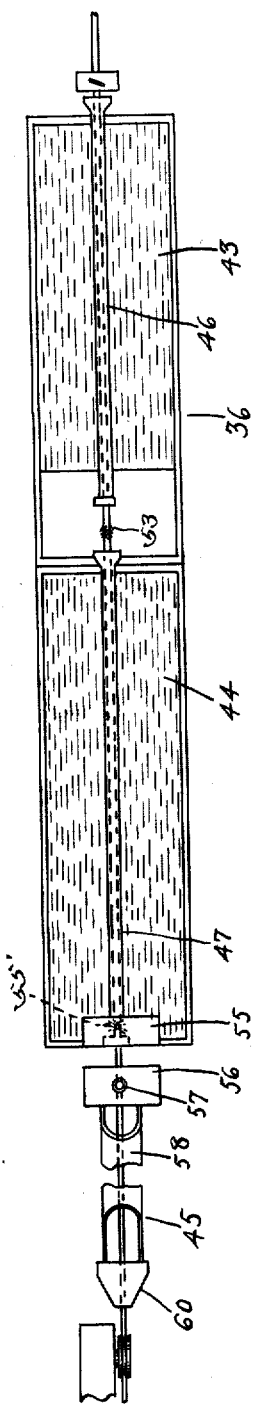
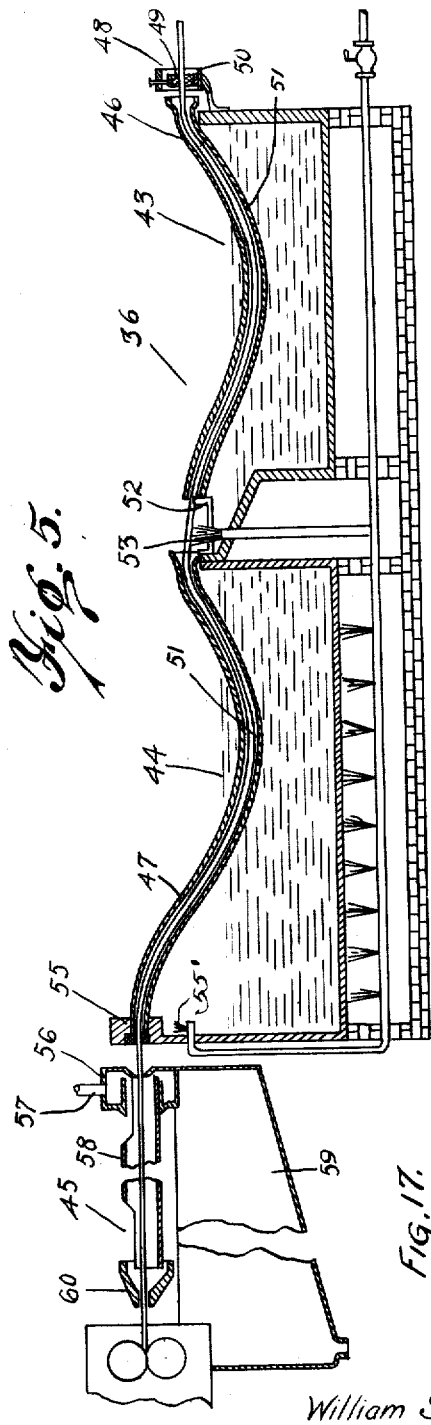
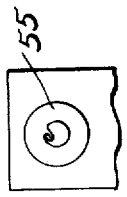
Inventor
William S. Pritchard
By Whittemore Hulbert & Whittemore
Attorneys

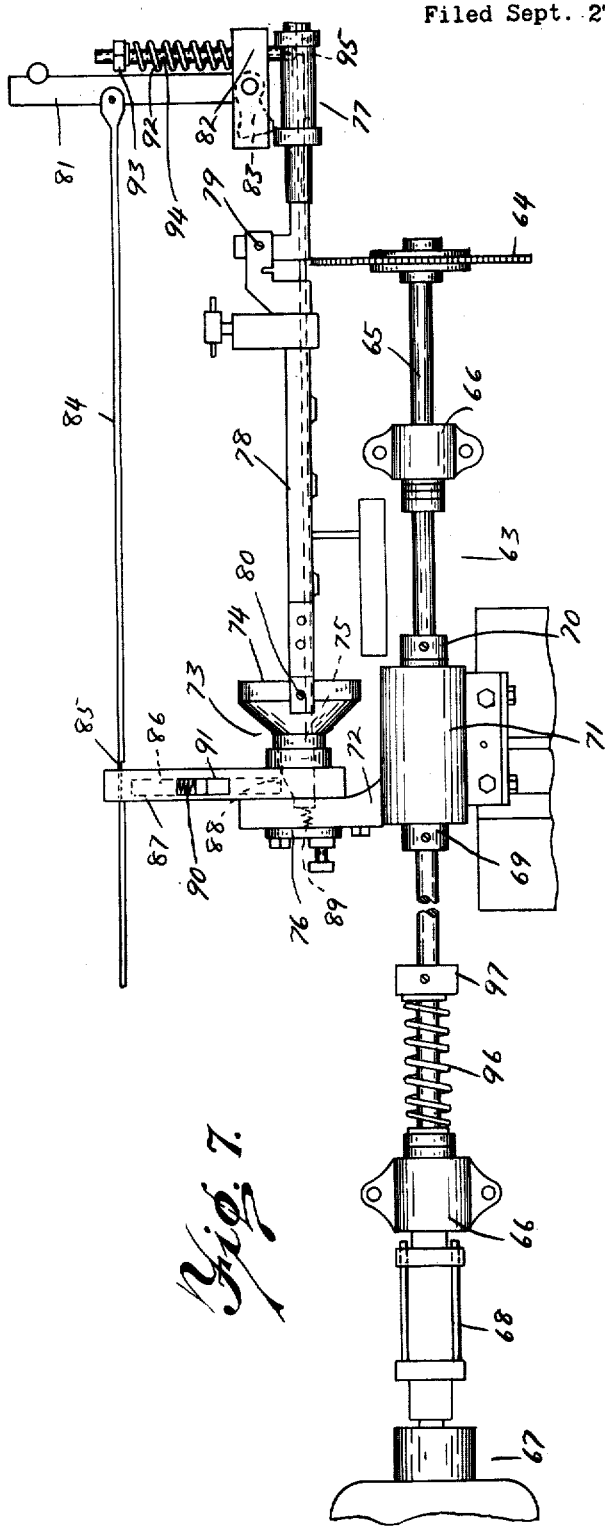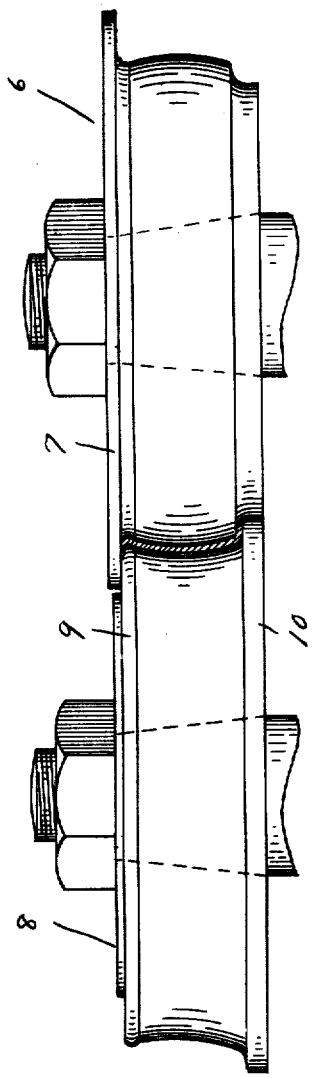

Aug. 14, 1923.

W. S. PRITCHARD 1,464,583

TUBE FORMING MACHINE

Filed Sept. 27, 1920

Inventor
William S. Pritchard

By Whittemore Hulbert & Whittemore
Attorneys

Aug. 14, 1923.

W. S. PRITCHARD

TUBE FORMING MACHINE

Filed Sept. 27, 1920

Inventor
William S. Pritchard
By Whittemore Hulbert & Whittemore
Attorneys

Inventor
William S. Pritchard

By Whittemore Hulbert & Whittemore
Attorneys

Patented Aug. 14, 1923.

1,464,583

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

TUBE-FORMING MACHINE.

Application filed September 27, 1920. Serial No. 413,026.

*To all whom it may concern:*

Be it known that I, WILLIAM S. PRITCHARD, a citizen of the United States of America, residing at Detroit, in the county of Wayne and State of Michigan, have invented certain new and useful Improvements in Tube-Forming Machines, of which the following is a specification, reference being had therein to the accompanying drawings.

The invention relates to the manufacture of metallic tubing of that type in which the tube is formed from a sheet metal ribbon with a soldered locked side seam.

The invention has for its main object the provision of an organized mechanism for continuously performing the operations necessary to the completion of the tubing and the delivery of the same in severed sections of predetermined length. Other objects are: to construct the first set of tube forming rolls in such a way as to prevent lateral displacement of the sheet metal ribbon; to vertically and laterally adjust the tube forming rolls to secure their correct relative positions; to provide means for lubricating the mandrel around which the tubing is closed; and to form the surface of one of the tube forming rolls in rear of the mandrel such that it will assist in pulling the metallic strip through the previous tube forming mechanism and also make the side seam of the tubing tighter.

The invention has for further objects the provision of a flux bath through which the tube is passed prior to passing through the solder bath; the provision of a wiper and of means for heating the tube at the rear end of the fluxing bath; and the provision of a heater for the wiper at the rear end of the solder bath.

Other objects of the invention reside in the novel features of construction and combination of parts as more fully hereinafter set forth.

In the drawings:

Figure 1 is a diagrammatical sectional side elevation, and Figure 2 is a diagrammatical plan view of the machine embodying my invention;

Figure 3 is a side elevation of the tube forming mechanism;

Figure 4 is a plan view thereof;

Figure 5 is a longitudinal section through the tube soldering mechanism;

Figure 6 is a plan view thereof;

Figure 7 is a plan view of the tube serving mechanism;

Figure 8 is a sectional elevation on the line 8—8 of Figure 3;

Figure 9:
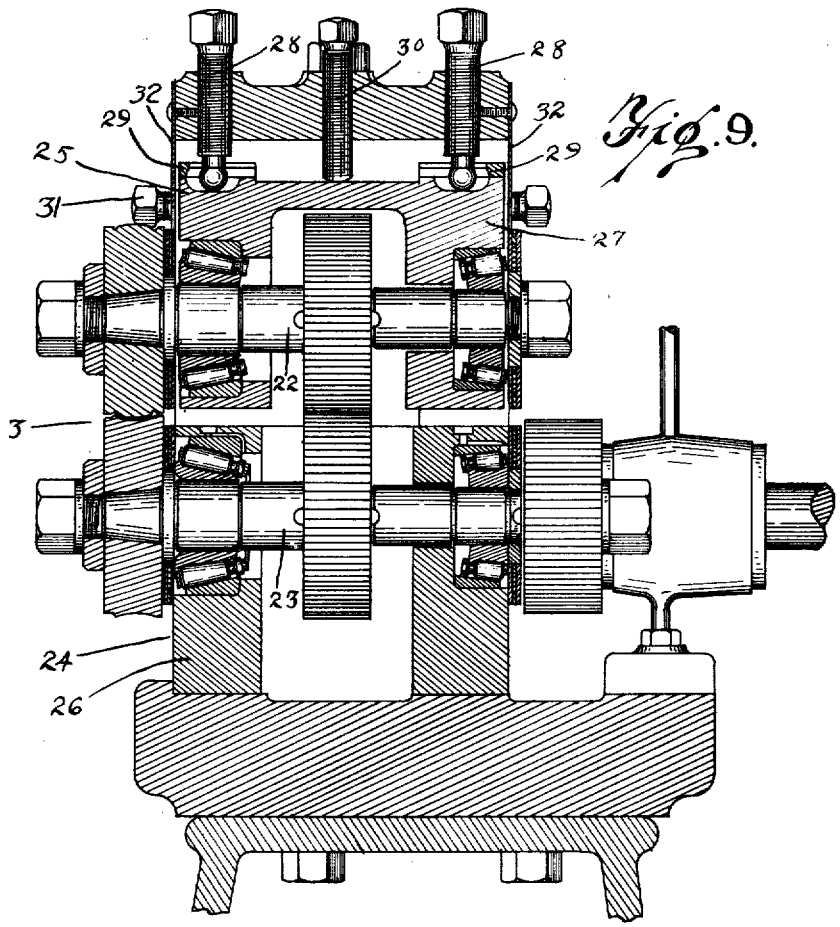
Figure 12:
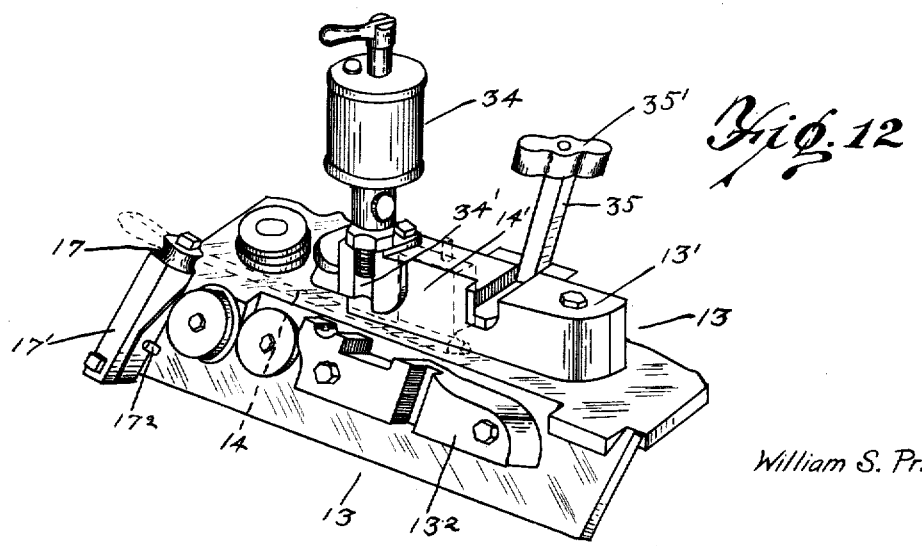
Figure 10:
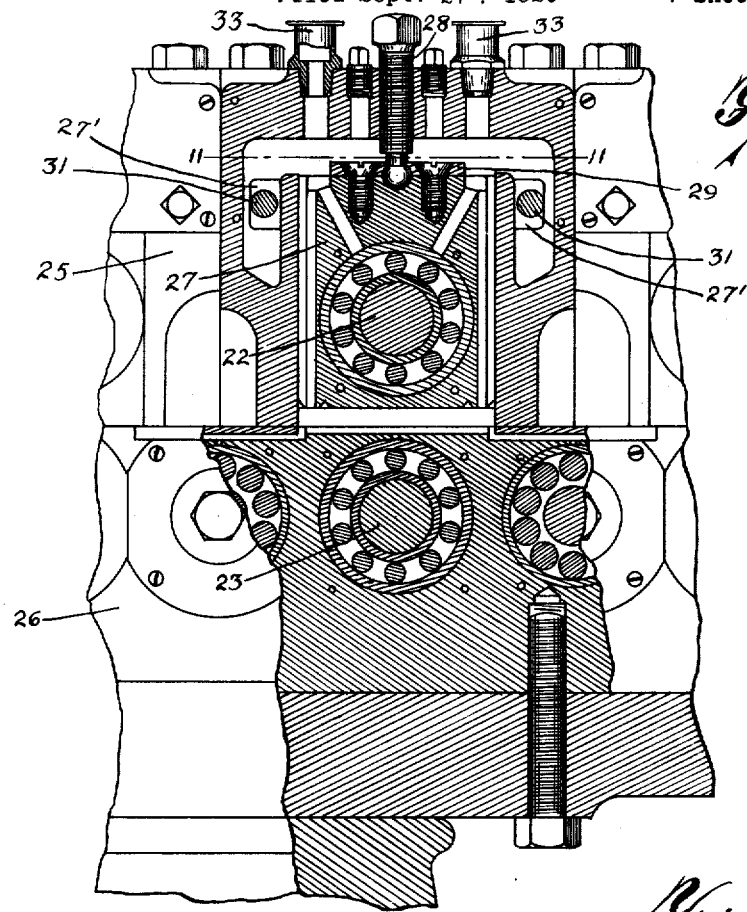
Figure 11:
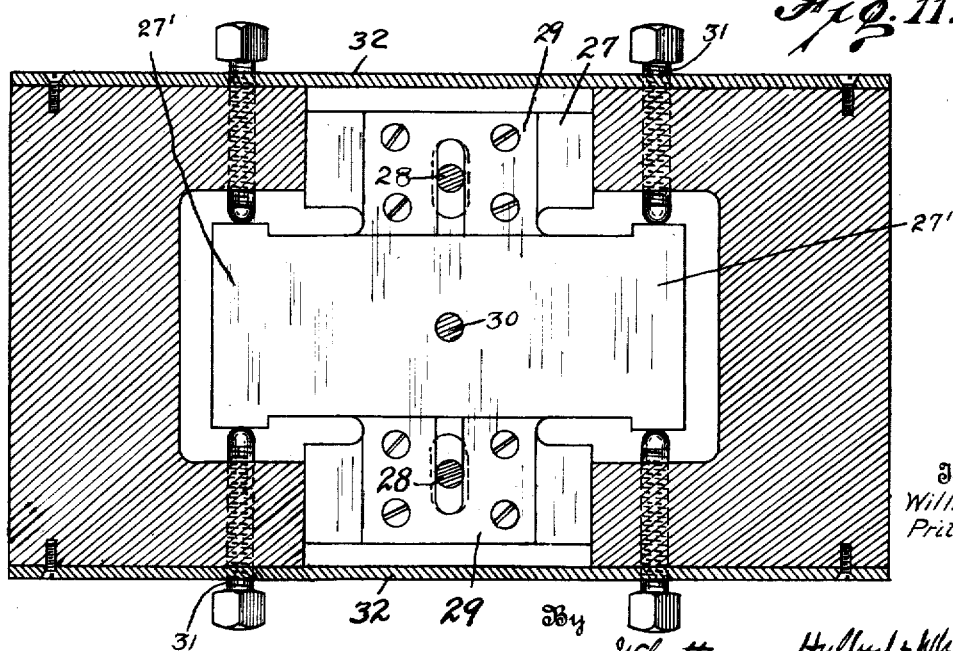

Figures 9 and 10 are cross sections on the lines 9—9 and 10—10 of Figure 4;

Figure 11 is a cross section on the line 11—11 of Figure 10;

Figure 12 is a perspective view of a detail of the tube forming mechanism.

Figure 13:
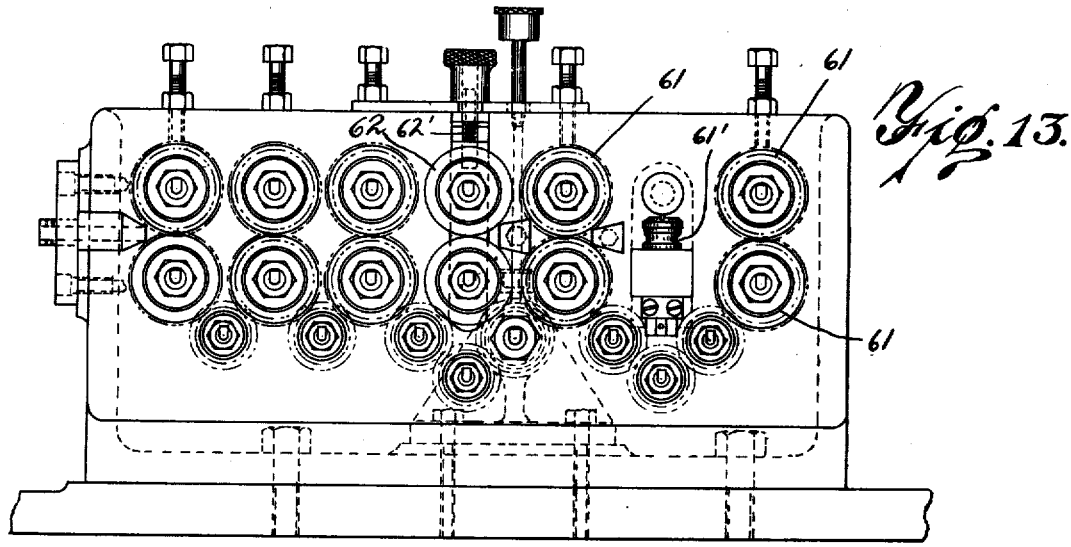

Figure 13 is a front elevation of the straightening rolls.

Figure 14:
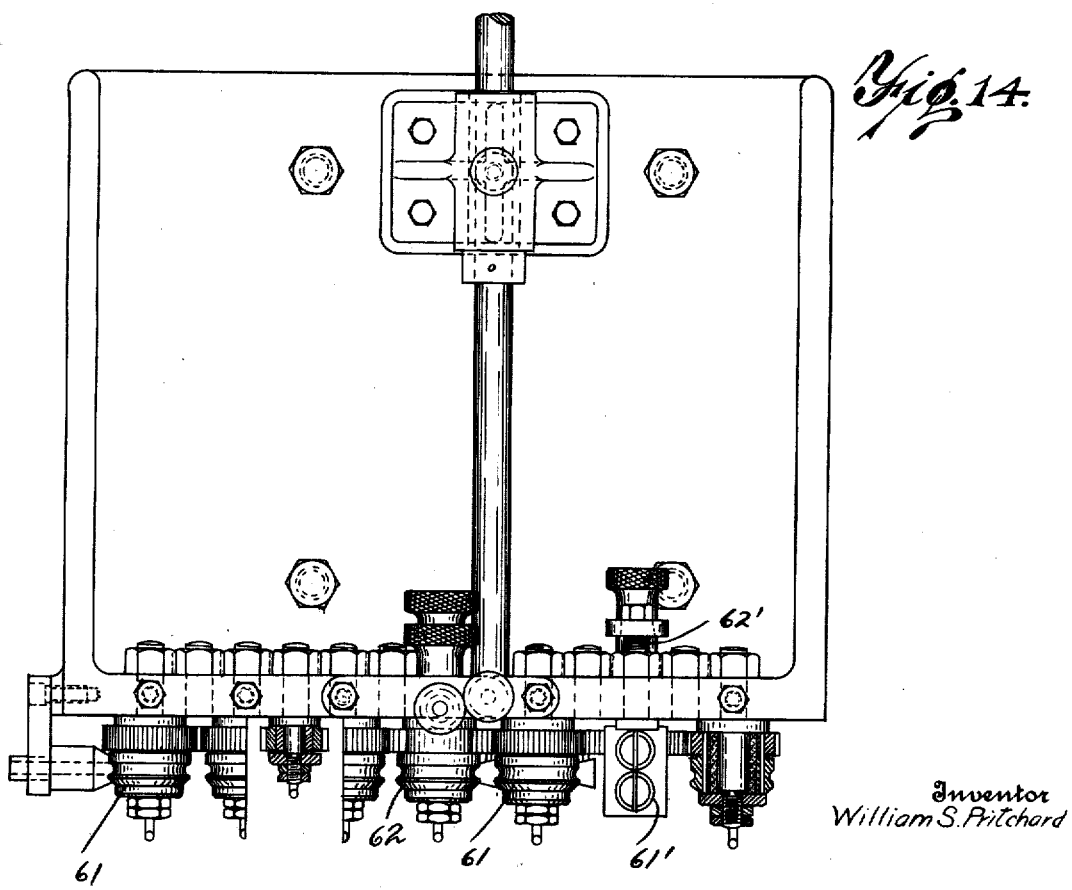

Figure 14 is a plan view thereof;

Figs. 15, 16 and 17 are details.

The invention comprises the tube forming means, seam soldering means, and tube severing means arranged in series together with means advancing and operating upon the sheet metal strip from which the tube is formed and also upon the formed tubing at a series of spaced points in the path of travel and producing an accumulative effect. By means of this organized mechanism, the pull upon the sheet metal strip and tubing passing through the different mechanisms greatly assist in carrying the portion of the strip being formed and the closed tubing through the machine and avoids clogging and stopping of the mechanism. Furthermore, the organized machine may be compactly arranged and at the same time the tubing may be formed from sheet metal strips of relatively great length, since the delivered tube is cut into predetermined short lengths.

1 is the tube forming mechanism comprising the pairs of cooperating forming rolls 2, 3, 4, and 5 which successively operate upon a metallic ribbon to bend the same into a U-shaped cross section and to form on the opposite edge portions thereof hooked flanges for the seam. The pairs of cooperating rolls 2 at the forward end of the machine in addition to performing the first forming operation act to guide the ribbon and prevent lateral displacement thereof. As shown particularly in Figure 8, the upper roll 6 has the outer flange 7 of greater diameter than the remainder thereof, which flange overlaps the middle portion of the lower roll 8 and lies adjacent the bead 9 upon the lower roll. The inner flange 10 of the lower roll 8 is of greater diameter than the remainder thereof and overlaps the middle portion of the upper roll 6, the periphery of this flange being engageable with the periphery of the corresponding portion of the upper roll. Flattening pairs of cooperating rolls 11 and 12 are preferably provided to engage the ribbon and flatten as well as straighten the same before passing between the pair of cooperating rolls 2. 13 is a mandrel holder through which the U-shaped strip passes, and 14 is a mandrel within the holder and extending rearwardly therefrom. The U-shaped strip is closed around this mandrel, and the hooked flanges engaged and the seam pressed into locking engagement. 15 and 16 are pairs of cooperating guide rolls to the rear of the holder 13 for closing the U-shaped strip and engaging the hooked flanges with each other. 17 is a guide roll to the rear of the rolls 15 and 16 for engaging the top of the tube, or its seam. 18 and 19 are pairs of cooperating rolls engaging the comparatively closed tube, these rolls being preferably driven at slightly greater peripheral speed than the pairs of cooperating rolls 2, 3, 4, and 5 and acting to remove any bulge in the tube and to straighten the same. The mandrel 14 extends between rolls 15 and 16, below the roll 17 and between the first pair of rolls 18, terminating in rear of the vertical plane through their axes. The upper roll 20 of the first pair of cooperating rolls 18 presses the tube seam into locking engagement and is provided with the roughened or knurled surface 21 which is engageable only with the seam of the tube, the arrangement being such that this upper roll has better traction upon the tube and therefore can better exert a pull thereon and further, the roughened or knurled surface assists in making the seam tighter. In the present instance the diameters of the pairs of cooperating rolls 18 and 19 are slightly greater than the diameters of the pairs of cooperating rolls 2, 3, 4 and 5, whereby with the same angular speed the first-mentioned rolls have a slightly greater peripheral speed than the last-mentioned rolls.

For the purpose of securing the rolls in their correct relative positions, they are vertically and laterally adjustable. As shown particularly in Figures 9, 10, and 11, the upper and lower rolls of each pair of cooperating rolls are mounted upon the upper and lower shafts 22 and 23 respectively which extend laterally through and are journaled in the housing 24. This housing is formed of the upper and lower sections 25 and 26 respectively, there being an upper section for each upper roll and these upper sections being suitably secured to each other. Each upper shaft 22 is journaled in a floating section 27 which is vertically and laterally adjustable within its respective upper section 25. This floating section 27 is vertically adjusted by means of the set screws 28 at opposite sides thereof and threadedly engaging in the top of the upper section. The lower ends of these set screws are preferably spherical and engage in correspondingly shaped grooves in the upper face of the floating section 27 and extending transversely thereof. 29 are slotted plates secured to the upper face of the floating section 27 and embracing the spherical ends of the set screws to retain the same in engagement with the floating section at all times, the slots in these plates permitting of lateral adjustment of the floating section. 30 is a lock set screw intermediate the set screws 28 for assisting in holding the floating section in its vertically adjusted position. 31 are set screws extending laterally through and threadedly engaging the sides of the upper section 25, the inner ends of these set screws engaging the sides of the end projections 27' upon the floating section 27. To vertically adjust the upper roll of each pair it is merely necessary to adjust the set screws 28 and afterward adjust the set screw 30. To laterally adjust the floating section 27, it is merely necessary to adjust the laterally extending set screws 31. Since the contour of the lower roll agrees substantially with the contour of the upper roll, the lower roll will laterally automatically adjust itself to agree to the lateral adjustment of the upper portion. Suitable plates 32 are provided at the sides of the upper sections 25 for enclosing the floating sections 27.

The anti-friction bearings for the shafts 22 and 23 are lubricated from grease cups 33 in the tops of the upper sections 25 which communicate with the anti-friction bearings by means of passageways leading from the top of the floating sections to the anti-friction bearings therein, and other passageways leading from the tops of the floating sections therethrough and communicating with the anti-friction bearings for the lower shafts 23 by passageways in the lower section 26.

In order to facilitate the passing of the strip through the mandrel holder 13 and around the mandrel 14, the lubricator 34 is provided upon the holder 13, and communicating with the passageway 34' therein which opens into the space surrounding the forward end of the mandrel. As shown, this lubricator is of the sight feed type and can be manually adjusted to control the flow of the lubricant into the holder and upon the mandrel.

As shown particularly in Figure 12, the holder 13 is formed into sections 13' and 13² which are hingedly connected to each other and are so arranged that when in operative position, they clamp the head 14' of the mandrel 14 to position the mandrel, and at the same time form the annular passageway around the mandrel and through which the U-shaped strip passes. The sections are secured in their correct relative positions by means of the pivoted link 35 upon the stationary section 13' which is adapted to engage registering slots in the sections, and has the thumb nut 35' at its outer end engageable with the outer face of the pivoted section 13² to clamp the sections together. The lubricator 34 is carried upon the stationary section 13' as is also one roll of each of the pairs of rolls 15 and 16. The roll 17 to the rear of the rolls 15 and 16 is carried upon the pivoted section of the holder and as shown is adapted to be readily removed therefrom. This roll is rotatably mounted upon the bar 17' which is secured to the pivoted section by means of the removable pin 17². Thus it is seen that the arrangement is such that the holder sections may be readily separated to permit of the removal of the mandrel and replacement thereof. Furthermore, the sections may be readily secured to each other and when secured, form the passageway therethrough for the strip and bring the rolls in their correct operating positions.

The soldering mechanism 36 is located in rear of the tube forming mechanism 1, and to avoid the entrance of solder into the tube, the forward end of the tube must be closed. This is accomplished by a closing device 37 at the rear end of the tube forming mechanism, and as shown comprises the lower grooved roll 38 and a cooperating rotatable roll 38'. The roll 38 is constantly driven by suitable gearing but the roll 38' is normally stationary and is only rotatable upon the actuation of the clutch 39 controlled by means of the handle 40. The roll 38' has projecting therefrom a die member 41 carrying a shearing edge 42. The die 41 is of a shape to press the upper portion of the tube down into and in parallelism to the lower portion of the tube in the groove in the lower roll 38, and at the same time the shearing edge 42 will cut the tube in the plane of contact between the upper and lower portions thereof. The effect of the mechanism is therefore to close the end of the tubing without enlarging the diameter thereof so that there is no obstruction formed to hinder the further movement of the tubing through the machine. Attention is directed to my copending application, Serial No. 282,593 upon tube closing machine which discloses more in detail the particular construction generally described above.

The soldering mechanism 36 comprises the fluxing bath 43, the soldering bath 44, and the washing and cooling device 45. 46 and 47 are guide tubes which extend down into the baths intermediate the ends and have their forward ends flared to receive the tubing as the same passes thereinto. Located forward of the fluxing bath is the wiper 48 comprising upper and lower sections 49 and 50 respectively which are adjustable relative to each other to take up wear. The tubing on passing from the tube forming mechanism 1 passes through the wiper 48 and then passes into the guide tube 46 which deflects the tube down into the fluxing bath and then upwardly and outwardly therefrom. This guide tube is preferably apertured as at 51 so that the flux may enter into and come in contact with the tubing. After the tubing emerges from the fluxing bath, it passes over the wiper 52 near the rear end of the receptacle containing the fluxing bath, which wiper preferably has a U-shaped groove engageable in by the tubing.

For the purpose of heating the tubing before entering the soldering bath so that the tubing will better take the solder, this tubing is heated by means of the jet 53 at the rear end of the container holding the fluxing bath, after which the tubing passes into the guide tube 47 and is deflected down into the soldering bath and upwardly and outwardly therefrom. This guide tube 47 is also preferably provided with apertures 54 for permitting the solder bath to enter thereinto and into contact with the tubing. 55 is a stripping die at the end of the guide tube 47, which die wipes off all the surplus solder from the tubing. This die is preferably heated by means of the jet 55' therebelow.

Beyond the solder bath 44 is arranged the washing and cooling device 45 which comprises the preferably annular water head 56 connected into by the water pipe 57 and adapted to jet the conical stream of water around the advancing tubing. 58 is a surrounding casing for the water and through which the tubing passes, and 59 is a receptacle into which the water drains. At the end of the casing 58 is a flaring mouthpiece 60 for guiding the end of the tubing into engagement with the series of pairs of cooperating rolls 61 for straightening the same after its passage through the guide tubes 46 and 47. This series of rolls is driven at a slightly greater peripheral speed than the pairs of cooperating rolls 18 and 19 whereby tension is applied to the tubing to assist in drawing the same through the soldering mechanism as well as the tube forming mechanism. The second set 61' of rolls from the forward end of the series is adjustable laterally and the fourth set 62 of rolls is adjustable vertically as by means of the screws 62' engaging the bearings for the rolls.

Beyond the series 61 of the straightening rolls is the tube severing mechanism 63 which comprises the rotary saw 64 mounted upon the arbor 65 which is slidably mounted in bearings 66 to be parallel to the path of travel of the formed tubing. 67 is an electric motor coupled to the arbor 65 by a telescopic connection 68 thereby permitting of longitudinal movement of the arbor relative to the motor. This arbor is moved longitudinally by the pressure of the advancing tubing and the construction for accomplishing this result is as follows: 69 and 70 are collars, upon the arbor 65, and 71 is a sleeve having the lateral arm 72 which carries the gage member 73. This gage member 73 has the flaring mouthpiece 74 for receiving the advancing end of the formed tubing and guides the same against a plunger 75 within the gage member, which plunger in turn engages the stop plate 76 upon the lateral arm 72 and by means of which motion is communicated to the arm 72, sleeve 71, collars 69 and 70, and arbor 65. Thus as soon as the end of the formed tubing engages the plunger 75 and forces the latter into contact with the stop plate 76, the arbor 64 and the rotary saw 65 carried thereby will be moved at the same speed as the formed tubing and in the same direction so that the tubing may be severed without interfering with its advancement.

For the purpose of laterally moving the formed tube into engagement with the saw 64, the following construction is provided: 77 is a guide into which the formed tube enters after leaving the straightening rolls 61. 78 is a second guide pivotally connected to the guide 77 as at 79 and to the flaring mouthpiece 74 as at 80. 81 is a rock arm pivotally mounted at its inner end upon the stationary member 82 upon the machine and having the bearing 83 which is adapted to engage the guide 77 upon rocking of the rock arm 81 to force the guide 77 laterally toward the saw 1 a sufficient distance to permit the saw to sever the formed tube passing through the guide. 84 is a tie rod pivotally connected to the rock arm and extending parallel to the guides 77 and 78. The opposite end of the tie rod preferably has a recessed portion 85 which is adapted to be engaged by the rod 86 and clamped against the laterally extending housing 87 through the outer end of which the tie rod passes. This housing 87 is secured to the lateral arm 72 and the plunger 86 is adapted to be forced laterally outward by means of the bevelled shoulder 88 upon the plunger 75.

For returning the parts to their normal position after the tube has been severed I have provided the coil spring 89 between the stop plate 76 and the inner end of the plunger 75, the coil spring 90, engageable with one end of the slot 91 in the housing 87 and a suitable shoulder upon the rod 86, the coil spring 92 abutting the stationary arm 82 of the machine and the nut 93 at the outer end of the rod 94, the inner end of the rod being pivotally connected to the guide 77 as at 95. There is also a coil spring 96 surrounding the arbor 65 and located between the rear bearing 66 and the collar 97, secured to the arbor.

From the above description it will be readily seen that I have provided an organized machine, the parts of which continuously operate to form metallic side seamed tubes of predetermined length from metallic ribbons. Since the speed of the feed rolls is progressively increased from the forward to the rear end of the machine, the tube and strip is maintained under tension at all times and at the same time the accumulative effect is the advancement of the strip at a constantly moving rate. By reason of the fact that the upper rolls of the tube forming mechanism are both vertically and laterally adjustable they can be properly positioned to perform the desired operations with decreased resistance offered to the advancement of the strip. The lubricating of the interior of the mandrel holder and of the mandrel also facilitates the advancement of the strip. Due to the fact that the formed tube is passed through a fluxing bath as well as the soldering bath, the rate of advancement of the tube can be increased and at the same time the machine can be operated for a longer period of time. The heating of the fluxed tube places the latter in condition to better take the solder and the heating of the stripping device at the rear end of the solder bath facilitates in removing the surplus solder.

What I claim as my invention is:

1. In a metallic tube forming machine, the combination of tube forming and closing mechanism, a flux bath, a solder bath, and means operating upon a metallic strip to successively pass the same through said tube forming and closing mechanism and immerse the same in said flux bath and solder bath.

2. In a metallic tube forming machine, the combination with a tube forming mechanism, a flux bath, a solder bath, a severing mechanism beyond said solder bath for cutting the soldered tube into predetermined lengths and means for continuously advancing the metallic strip successively through said tube forming mechanism, flux bath, solder bath, and tube severing mechanism.

3. In a metallic tube forming machine, the combination with tube forming mechanism of soldering means, a stripping die for removing surplus solder from the formed tube and means independent of the surplus solder for heating said stripping die.

4. In a metallic tube forming machine, the combination of the tube forming mechanism, fluxing means, soldering means, means for removing surplus flux from the formed tube, means for heating the formed tube prior to entering said soldering means and means heated independently of the surplus solder for removing surplus solder from said formed tube.

5. In a metallic tube forming machine, the combination with tube forming mechanism, of a soldering bath, a fluxing bath between said tube forming mechanism and soldering bath, apertured guide tubes for the formed tube for leading the same into and out of said fluxing and soldering baths, an adjustable wiper at the forward end of said fluxing bath for cleaning the formed tube, a wiper near the rear end of said fluxing bath for removing surplus flux from the formed tube, means near the rear end of said fluxing bath for heating the formed tube, a wiping die at the rear end of said soldering bath for removing surplus solder from the formed tube and means for heating said wiping die.

6. In a metallic tube forming machine, tube forming mechanism, comprising a series of pairs of cooperating rolls having a pair of rolls operating upon the sides of a metallic ribbon to change its cross-sectional contour, said pair of rolls guiding the ribbon to prevent lateral displacement thereof.

7. In a metallic tube forming machine, tube forming mechanism having a pair of cooperating upper and lower rolls between which a metallic strip is passed, shafts carrying said rolls, a floating section for one of said shafts adapted to be moved vertically and laterally, a housing section inclosing said floating section, set screws in the sides of said housing section engageable with the sides of said floating section for laterally adjusting the same, set screws in the top of said housing section engageable with the top of said floating section for vertically adjusting the same, and means upon said floating section for securing said last mentioned set screws to said floating section.

8. In a metallic tube forming machine, tube forming mechanism having a pair of cooperating upper and lower rolls between which a metallic strip is passed, a floating section carrying said upper roll and adapted to be moved vertically and laterally, a housing section inclosing said floating section, set screws in the sides of said housing section and engageable with the sides of said floating section for laterally adjusting the same, set screws in the top of said housing section engageable with the top of said floating section for vertically adjusting the same, said last mentioned set screws having substantially spherical inner ends and said floating section having transversely extending rounded grooves engaged in by said inner ends of the set screws, and slotted plates secured to the top of said floating section and having the walls of their slots embracing said inner ends of the set screws to retain the latter in engagement with said floating section, the slots in said plates permitting of lateral adjustment of said floating section.

9. In a tube forming machine, the combination with a mandrel holder having a passageway therethrough, of means upon said holder for lubricating the passageway.

10. In a tube forming machine tube forming mechanism comprising pairs of cooperating rolls between which a metallic ribbon is passed, a mandrel holder at the rear of said rolls, a mandrel within said holder and around which the metallic ribbon is formed, and means upon said holder for lubricating the interior of said holder.

11. In a tube forming machine, a mandrel holder comprising a pair of separable sections forming a passageway therebetween, a mandrel extending longitudinally through the passageway, and means for lubricating the passageway and said mandrel.

12. In a tube forming machine, the combination with a mandrel holder comprising a fixed section and a cooperating pivoted section forming therebetween a passageway, and means for securing said sections to each other, of a mandrel within the passageway and clamped between said sections.

13. In a tube forming machine, the combination with a mandrel holder having a fixed section and a cooperating section pivotally connected to said fixed section and forming therewith a passageway, of a mandrel extending within said passageway and clamped between said holder sections, and means for lubricating said passageway.

14. In a tube forming machine, the combination with a mandrel holder having a fixed section and a cooperating section pivotally connected to said fixed section and forming therewith a passageway, pivoted means for connecting said sections together, a mandrel extending within said passageway and clamped between said holder sections, and a lubricator upon said fixed section connected into said passageway above said mandrel.

15. In a metallic tube forming machine, the combination of tube forming mechanism, means in rear of said tube forming mechanism for soldering the formed tube, and means heated independently of the surplus solder for removing surplus solder from the formed tube.

16. In a metallic tube forming machine, tube forming mechanism having a pair of cooperating rolls with peripheral portions operating upon the sides of a metallic ribbon to change its cross-sectional contour and with side flanges at the ends of and overlapping said peripheral portions to prevent lateral displacement of the ribbon.

17. In a tube forming machine, the combination with rolls for forming a U-shaped strip with hooked flanges, of means for forming the strip into a tube with its hooked flanges in engagement with each other, a mandrel, a pair of rolls on opposite sides of said mandrel for pressing the hooked flanges into locking engagement, one of said rolls having a roughened surface in engagement with the outer hooked flange, and means for rotating said roll with the roughened surface, at greater peripheral speed than said first-mentioned rolls.

18. In a metallic tube forming machine, the combination of means for continuously advancing a metallic strip of indeterminate length and forming the same into a lock-seam tube, a flux bath, a solder bath, and means operating upon the lock-seam tube for immersing the same successively in said flux bath and solder bath.

19. In a metallic tube forming machine, the combination of means for advancing a metallic strip of indeterminate length and forming the same into a seam tube, a flux bath, a solder bath, and means for successively immersing the seam of said tube in said flux bath and solder bath.

20. In a metallic tube forming machine, the combination of means for advancing a metallic strip of indeterminate length and forming the same into a seam tube, a flux bath, a solder bath, means for successively immersing the seam of said tube in said flux bath and solder bath, and means for cutting the soldered seam tube into predetermined lengths.

21. In a metallic tube forming machine, the combination of means for advancing and progressively forming a flat metallic strip of indeterminate length into a lock-seam tube, a flux bath, means for deflecting the lock-seam tube into and out of said flux bath, means for soldering the lock-seam tube, and means for then cutting the soldered lock-seam tube into predetermined lengths.

22. In a metallic tube forming machine, the combination of mechanism for continuously advancing and progressively forming a strip of indeterminate length into a lock seam tube, a flux bath, a solder bath, a severing mechanism beyond said solder bath for cutting the soldered tube into predetermined lengths, and means for successively deflecting said lock-seam tube into and out of said flux bath and solder bath and advancing the soldered tube through said severing mechanism during the continuous advancement of the strip and tube.

23. The method of forming soldered seam tubing comprising the advancement of a metallic strip of indeterminate length, and during the advancement the successive forming of the strip into a seam tube, deflecting of the seam of the tube into and out of a flux bath and heating the seam of the tube by solder to a temperature such that the tube will retain sufficient solder to seal the same.

24. The method of forming soldered seam tubing comprising the advancement of a strip of indeterminate length and during the advancement the forming of the strip into a seam tube, the deflecting of the strip into and out of a flux bath, and the uniting by solder of the seam portions of the strip when the latter is in the form of a seam tube.

25. The method of forming soldered seam tubing comprising the advancement of a strip of indeterminate length and during the advancement the forming of the strip into a seam tube, the deflecting of the strip into and out of a flux bath, the uniting by solder of the seam portions of the strip when the latter is in the form of a seam tube, and the severing of the soldered seam tube into predetermined lengths.

In testimony whereof I affix my signature.

WILLIAM S. PRITCHARD.